(12) United States Patent
Ryu et al.

(10) Patent No.: US 10,479,161 B2
(45) Date of Patent: Nov. 19, 2019

(54) VEHICLE AIR-CONDITIONING SYSTEM

(71) Applicant: HANON SYSTEMS, Daejeon (KR)

(72) Inventors: Jae Chun Ryu, Daejeon (KR); Young Hum Han, Daejeon (KR); Chul Hee Kim, Daejeon (KR); Joong Man Han, Daejeon (KR); Hyeon Gyu Kim, Daejeon (KR); Kyung Ju An, Daejeon (KR); Tae Yong Park, Daejeon (KR); Sung Je Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/739,811

(22) PCT Filed: Jan. 9, 2017

(86) PCT No.: PCT/KR2017/000258
§ 371 (c)(1),
(2) Date: Dec. 26, 2017

(87) PCT Pub. No.: WO2017/126836
PCT Pub. Date: Jul. 27, 2017

(65) Prior Publication Data
US 2018/0361819 A1 Dec. 20, 2018

(30) Foreign Application Priority Data

Jan. 18, 2016 (KR) .................. 10-2016-0005807
Jul. 15, 2016 (KR) .................. 10-2016-0089687

(51) Int. Cl.
*B60H 1/00* (2006.01)
*B60H 1/32* (2006.01)

(52) U.S. Cl.
CPC ..... *B60H 1/00028* (2013.01); *B60H 1/00064* (2013.01); *B60H 1/3227* (2013.01);
(Continued)

(58) Field of Classification Search
CPC .......... B60H 2001/00092; B60H 2001/00135; B60H 2001/00185; B60H 2001/002;
(Continued)

(56) References Cited

U.S. PATENT DOCUMENTS 1,942,295 A 1/1934 Kerr, Jr. et al.
2,788,077 A * 4/1957 Wittren .................. B60B 19/00
180/340
(Continued)

FOREIGN PATENT DOCUMENTS

JP H05155245 A 6/1993
JP 2013141933 A 7/2013
(Continued)

OTHER PUBLICATIONS

International Search Report and Written Opinion dated May 1, 2017 from International Patent Application Serial No. PCT/KR2017/000258, with English translation of International Search Report.

*Primary Examiner* — Melvin Jones
(74) *Attorney, Agent, or Firm* — Dickinson Wright PLLC

(57) ABSTRACT

The present invention relates to a vehicle air-conditioning system and, more particularly, to a vehicle air-conditioning system in which an air-conditioning module consisting of an air-conditioning case and a blowing apparatus is disposed at a side of an engine room with respect to a dash panel, and a distribution duct for distributing cold and hot air discharged from the air-conditioning case into the inside of a vehicle is disposed on the indoor side of the vehicle with respect to the dash panel. The vehicle air-conditioning system may prevent a reverse flow of outdoor air into a cold air discharge port and a hot air discharge port due to the wind pressure when driving by forming a shielding means at the sides of the cold air discharge port and the hot air discharge port, which discharge the cold and hot air of the air-conditioning case to the outside, thereby improving the (Continued)

cooling and heating performance by smoothly discharging heat through the cold air discharge port and the hot air discharge port.

18 Claims, 16 Drawing Sheets

(52) U.S. Cl.
CPC .............. *B60H 2001/00092* (2013.01); *B60H 2001/00135* (2013.01)

(58) Field of Classification Search
CPC .. B60H 1/00028; B60H 1/00; B60H 1/00064; B60H 1/3227; B60H 1/00057; B60H 1/00207; B60H 1/00564
See application file for complete search history.

(56) References Cited

U.S. PATENT DOCUMENTS

| | | | |
|---|---|---|---|
| 5,478,274 A * | 12/1995 | Danieau | B60H 1/00064 165/43 |
| 6,431,267 B1 * | 8/2002 | Tanaka | B60H 1/00064 165/204 |
| 2006/0208100 A1 * | 9/2006 | Ellison | B60H 1/00064 237/12.3 B |
| 2007/0023180 A1 * | 2/2007 | Komarek | B60H 1/00028 165/202 |
| 2009/0068939 A1 * | 3/2009 | Onda | B60H 1/00685 454/152 |
| 2013/0231036 A1 * | 9/2013 | Kim | B60H 1/00064 454/121 |
| 2015/0038067 A1 * | 2/2015 | Byon | B60H 1/00021 454/160 |

FOREIGN PATENT DOCUMENTS

| | | |
|---|---|---|
| JP | 2015039893 A | 3/2015 |
| KR | 20060046725 A | 5/2006 |
| KR | 20110089576 A | 8/2011 |
| KR | 20140028498 A | 3/2014 |
| KR | 20140054917 A | 5/2014 |
| WO | 2013105202 A1 | 7/2013 |

* cited by examiner

Prior Art

Prior Art

VEHICLE AIR-CONDITIONING SYSTEM

CROSS-REFERENCE TO RELATED APPLICATIONS

This application is a U.S. National Stage of International Application No. PCT/KR2017/000258, filed Jan. 9, 2017, which claims the benefit and priority of KR 10-2016-0005807 filed Jan. 18, 2016 and KR 10-2016-0089687 filed Jul. 15, 2016. The entire disclosures of each of the above applications are incorporated herein by reference.

TECHNICAL FIELD

The present invention relates to an air conditioning system for a vehicle, and more particularly, to an air conditioning system for a vehicle, in which an air-conditioning module having an air-conditioning case and a blower unit is disposed at a side of an engine room with respect to a dash panel, a distribution duct for distributing cold air and hot air discharged from the air-conditioning case into the interior of a vehicle is disposed on the indoor side of the vehicle with respect to the dash panel, and a shielding means is formed at a cold air discharge port and a hot air discharge port for discharging the cold air and the hot air of the air-conditioning case to the outside, thereby preventing outdoor air from flowing backward toward the cold air discharge port and the hot air discharge port by wind pressure while the vehicle runs, and improving cooling performance and heating performance by smoothly discharging heat through the cold air discharge port and the hot air discharge port.

BACKGROUND ART

In general, as shown in FIG. 1, an air conditioning system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and for evaporating the refrigerant to cool the air discharged to the interior of the vehicle through heat absorption by evaporative latent heat, and that the compressor 1, the condenser 2, the expansion valve 3 and the evaporator 4 are connected with one another via refrigeration pipes. The air conditioning system cools the interior of the vehicle through the following refrigerant circulation process.

When a cooling switch (not shown) of the air conditioning system is turned on, first, the compressor 1 inhales and compresses vapor-phase refrigerant of low-temperature and low-pressure while driving by driving power of an engine or a motor, and then sends the refrigerant in the gaseous phase of high-temperature and high-pressure to the condenser 2. Then, the condenser 2 condenses the vapor-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the vapor-phase refrigerant is inhaled into the compressor 1, and then, recirculates the refrigeration cycle as described above. The evaporator is mounted inside the air-conditioning case mounted to the interior of the vehicle to cool the interior of the vehicle. That is, the air blown by the blower (not shown) is cooled by evaporative latent heat of the liquid-phase refrigerant circulating inside the evaporator 4 and discharged to the interior of the vehicle in a cooled state so as to cool the interior of the vehicle. Moreover, the interior of the vehicle is heated by a heater core (not shown), which is mounted inside the air-conditioning case, and, through which coolant of the engine circulates, or by an electric heater (not shown) mounted inside the air-conditioning case. In the meantime, the condenser 2 is mounted at the front side of the vehicle to radiate heat while exchanging heat with air.

Recently, an air conditioning system which carries out heating and cooling only using a refrigeration cycle has been developed. As shown in FIG. 2, such an air conditioning system includes: a cold air passageway 11 and a warm air passageway 12 which are partitioned to the right and the left inside one air-conditioning case 10; an evaporator 4 mounted on the cold air passageway 11 for cooling; and a condenser 2 mounted on the warm air passageway 12 for heating. In this instance, at an outlet of the air-conditioning case 10, formed are a plurality of air outflow ports 15 for supplying air to the interior of the vehicle and a plurality of air discharge ports 16 for discharging air to the exterior of the vehicle.

Furthermore, blowers 20 which are operated individually are respectively mounted at an inlet of the cold air passageway 11 and at an inlet of the warm air passageway 12. The air-conditioning case 10 and the blowers 20 in the air conditioning system are mounted inside the interior of the vehicle based on a dash panel (not shown), which partitions an engine room from the interior of the vehicle. Therefore, in a cooling mode, cold air cooled while passing through the evaporator 4 of the cold air passageway 11 is discharged to the interior of the vehicle through the air outflow port 15 to cool the interior of the vehicle, and in this instance, warm air heated while passing through the condenser 2 of the warm air passageway 12 is discharged to the exterior of the vehicle through the air discharge port 16.

In a heating mode, warm air heated while passing through the condenser 2 of the warm air passageway 12 is discharged to the interior of the vehicle through the air outflow port 15 to heat the interior of the vehicle, and in this instance, cold air cooled while passing through the evaporator 4 of the cold air passageway 11 is discharged to the exterior of the vehicle through the air discharge port 16.

However, the conventional air conditioning system must discharge hot air passing through the condenser to the outside through the air discharge port 16 in the cooling mode and discharge cold air passing through the evaporator to the outside through the air discharge port 16. In the above process, the conventional air conditioning system has several disadvantages in that the outdoor air flows backward through the air discharge port 16 due to wind pressure while the vehicle runs, and in that cooling performance and heating performance are deteriorated because heat is not discharged smoothly through the air discharge port 16.

DISCLOSURE

Technical Problem

Accordingly, the present invention has been made in an effort to solve the above-mentioned problems occurring in the prior arts, and it is an object of the present invention to provide an air conditioning system for a vehicle, in which an air-conditioning module having an air-conditioning case and a blower unit is disposed at a side of an engine room with respect to a dash panel, a distribution duct for distributing cold air and hot air discharged from the air-conditioning case into the interior of a vehicle is disposed on the indoor side of the vehicle with respect to the dash panel, and a shielding means for discharging the cold air and the hot air of the air-conditioning case to the outside is formed at a cold air discharge port and a hot air discharge port, thereby preventing outdoor air from flowing backward toward the cold air discharge port and the hot air discharge port by wind pressure while the vehicle runs, and improving cooling performance and heating performance by smoothly discharging heat through the cold air discharge port and the hot air discharge port.

Technical Solution

To achieve the above objects, the present invention provides an air conditioning system for a vehicle including: an air-conditioning case having a cold air passageway and a warm air passageway, a cold air discharge port for discharging cold air of the cold air passageway to the outside, and a warm air discharge port for discharging warm air of the warm air passageway; and a shielding means disposed on the outer face of the air-conditioning case to prevent outdoor air from flowing backward to the cold air discharge port and the warm air discharge port.

Advantageous Effects

The air conditioning system for a vehicle according to the present invention includes the air-conditioning module, which has an air-conditioning case and a blower unit and is disposed at a side of an engine room with respect to a dash panel, a distribution duct, which is disposed on the indoor side of the vehicle with respect to the dash panel to distribute cold air and hot air discharged from the air-conditioning case into the interior of a vehicle, and a shielding means, which is formed at a cold air discharge port and a hot air discharge port for discharging the cold air and the hot air of the air-conditioning case to the outside, so that the air conditioning system for the vehicle can prevent preventing outdoor air from flowing backward toward the cold air discharge port and the hot air discharge port by wind pressure while the vehicle runs, and improve cooling performance and heating performance by smoothly discharging heat through the cold air discharge port and the hot air discharge port.

MODE FOR INVENTION

Figure 1:
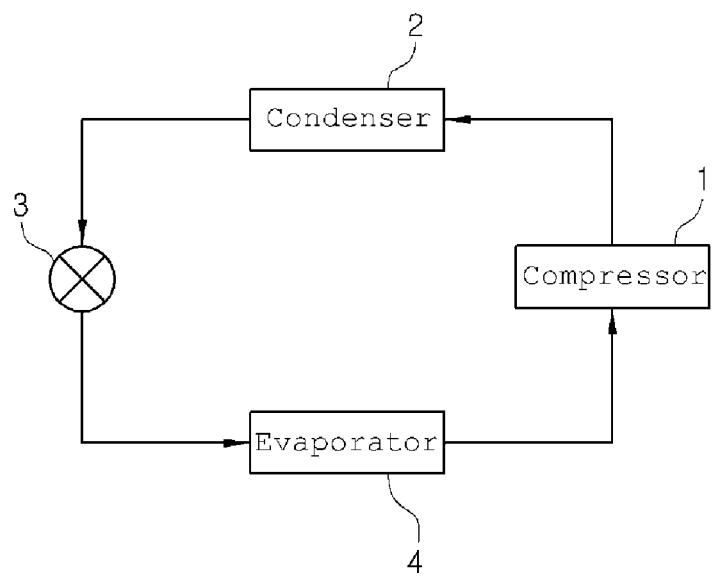
FIG. 1 is a schematic diagram showing a refrigeration cycle of a general air conditioning system for a vehicle.
Figure 2:
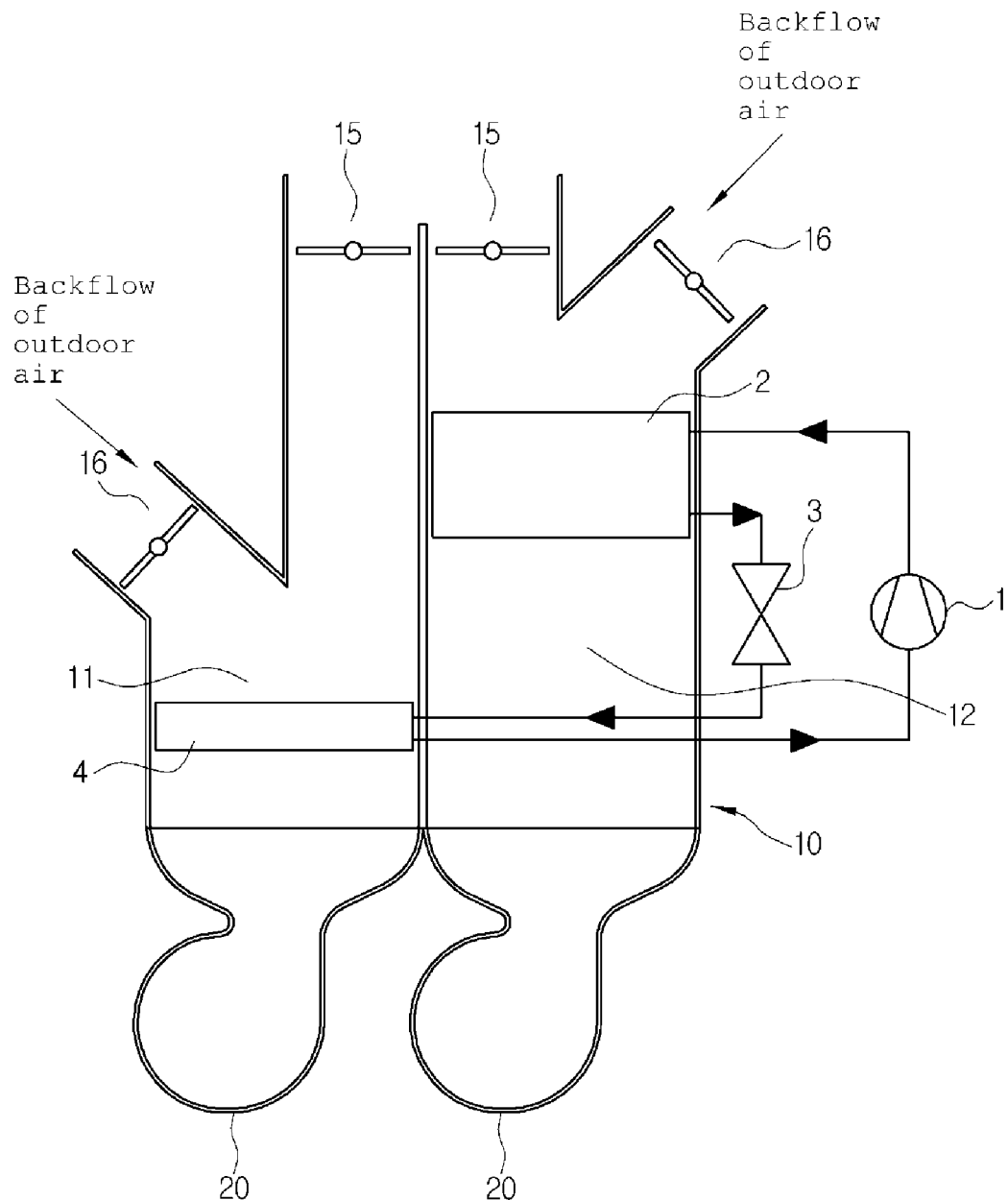
FIG. 2 is a view showing a conventional air conditioning system for a vehicle.
Figure 3:
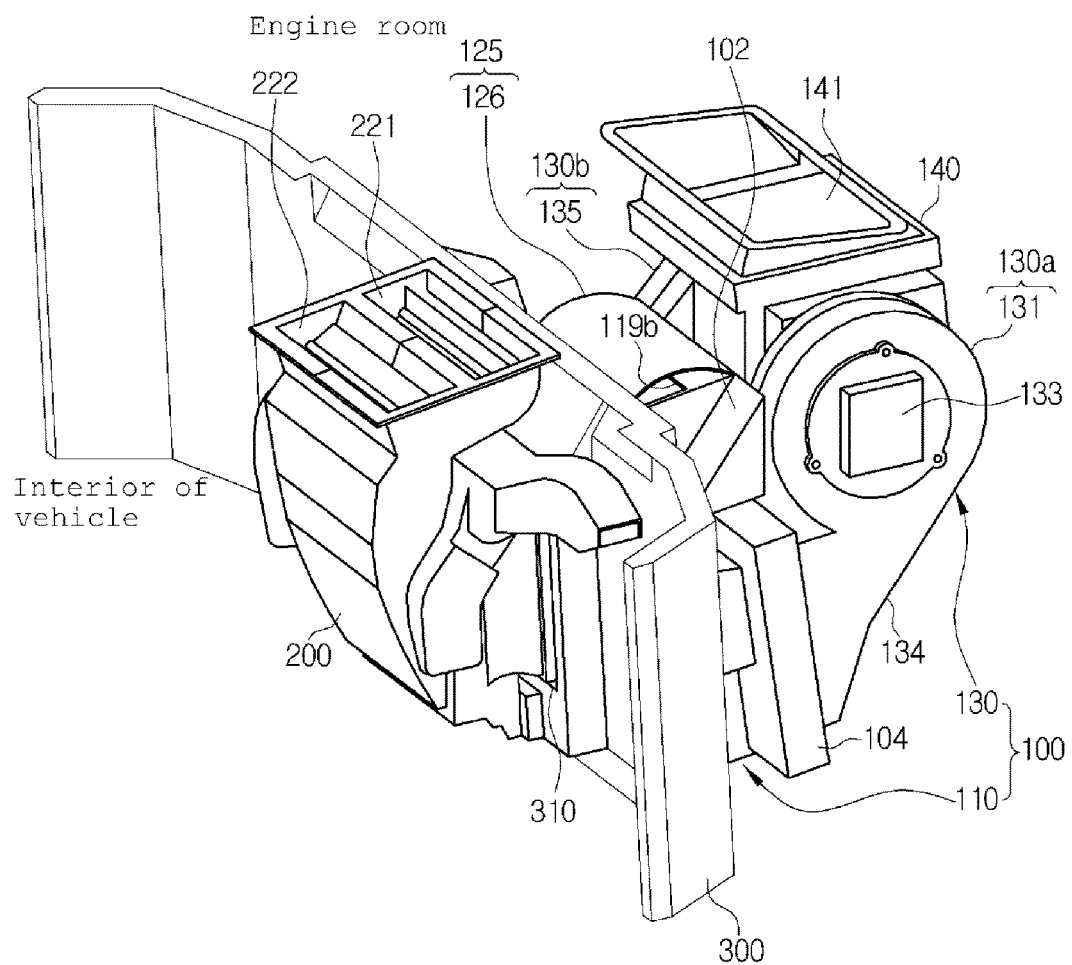
FIG. 3 is a perspective view showing an air conditioning system for a vehicle according to a preferred embodiment of the present invention.
Figure 4:
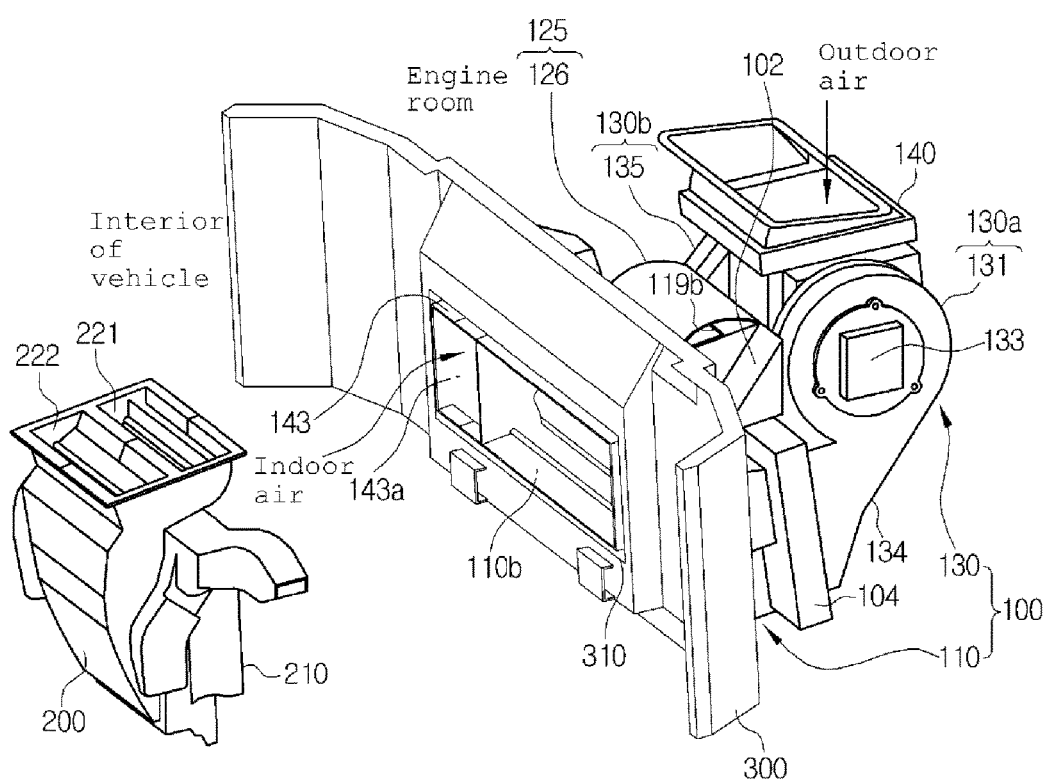
FIG. 4 is a perspective view showing a state where a distribution duct in FIG. 3 is separated.
Figure 5:
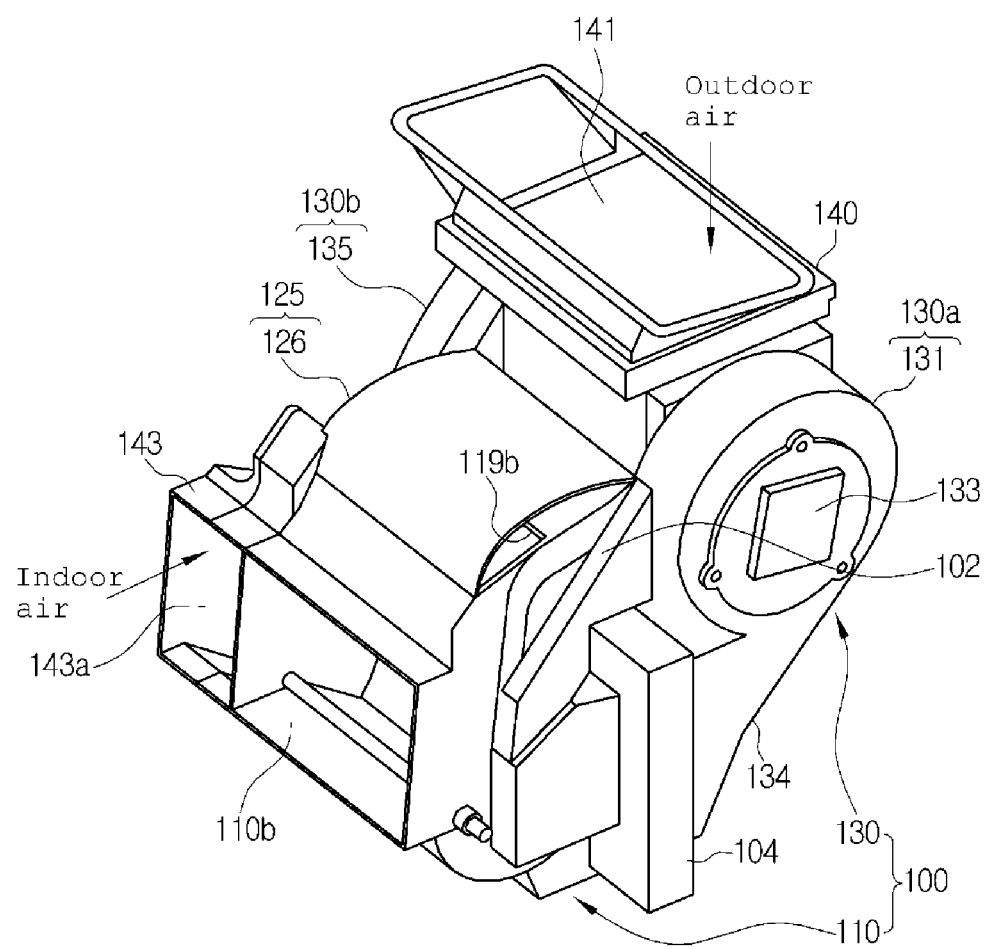
FIG. 5 is a perspective view showing an air-conditioning module of the air conditioning system for the vehicle according to the present invention.
Figure 6:
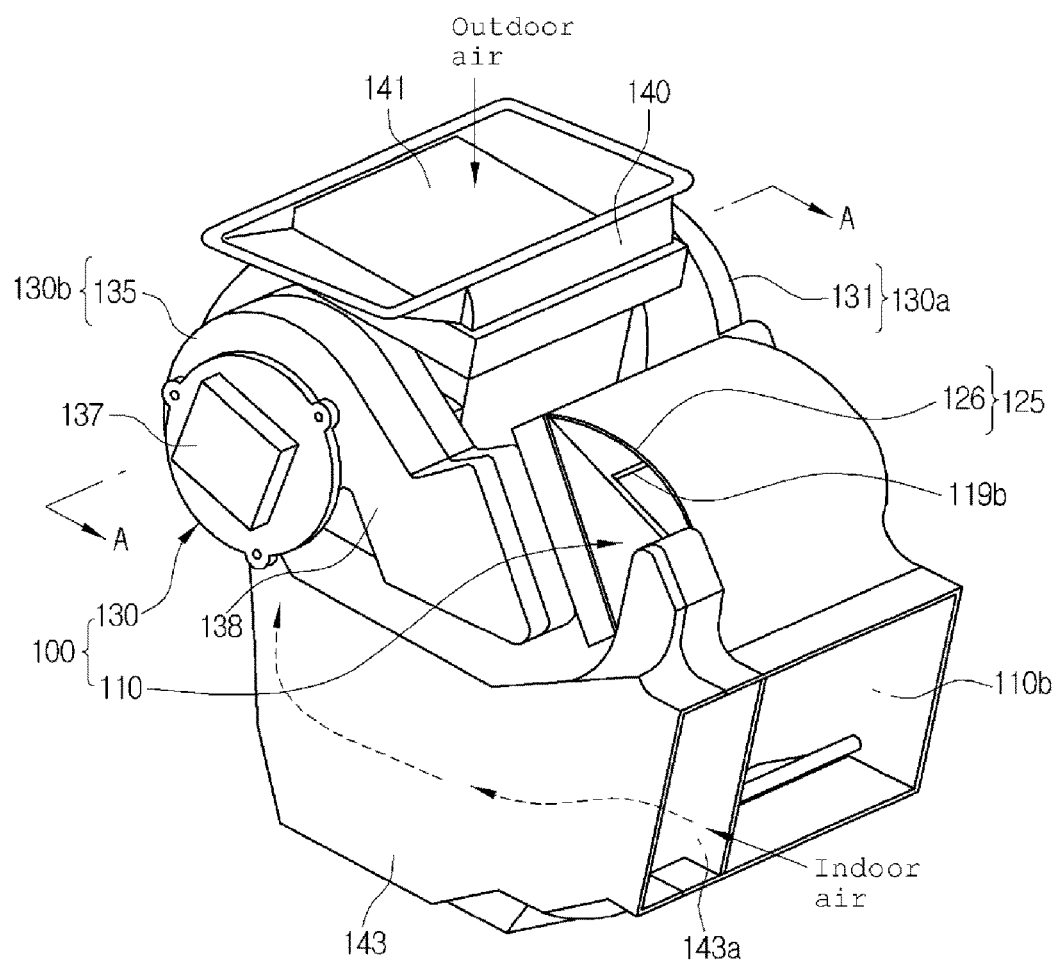
FIG. 6 is a perspective view viewed from an indoor air inflow duct of FIG. 5.
Figure 7:
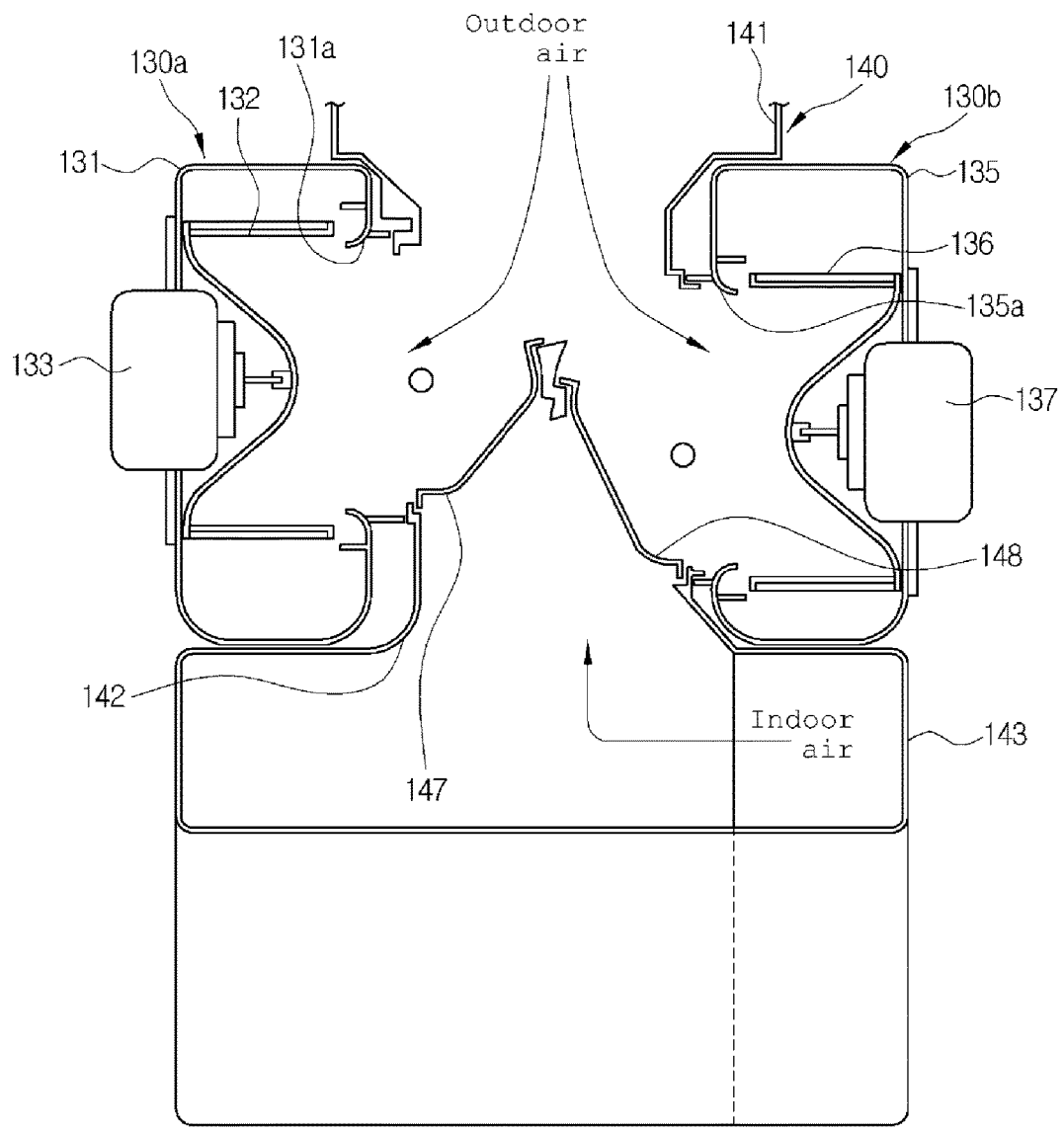
FIG. 7 is a sectional view taken along the line A-A of FIG. 6.

Reference will be now made in detail to preferred embodiments of the present invention with reference to the attached drawings.

As shown in the drawings, an air conditioning system for a vehicle according to the present invention includes a compressor (not shown), a condenser 102, expansion means (not shown) and an evaporator 104, which are connected with one another in order through a refrigerant circulation line (not shown), so as to carry out cooling through the evaporator 104 and carry out heating through the condenser 102.

First, the compressor inhales and compresses vapor-phase refrigerant of low-temperature and low-pressure discharged from the evaporator 104 while operating by receiving a driving force from a power supply, such as an engine or a motor, and then, discharges the refrigerant in a vapor phase of high-temperature and high-pressure.

The condenser 102 exchanges heat between the vapor-phase refrigerant of high-temperature and high-pressure, which is discharged from the compressor and flows inside the condenser 102, and air passing through the condenser 102, and in this instance, the refrigerant is condensed and the air is heated to be changed into warm air.

Such a condenser 102 may have a structure that the refrigerant circulation line (refrigerant pipe) is arranged in the form of a zigzag and a radiation fin (not shown) is mounted or a structure that a plurality of tubes (not shown) are stacked up and a radiation fin is mounted between the tubes.

Therefore, the vapor-phase refrigerant of high-temperature and high-pressure discharged from the compressor exchanges heat with the air to be condensed while flowing along the zigzag-shaped refrigerant circulation line or the tubes, and in this instance, the air passing through the condenser 102 is heated to be changed into warm air.

Moreover, the expansion means (not shown) rapidly expands liquid-phase refrigerant, which flows after being discharged from the condenser 102, by throttling effect and sends the expanded refrigerant in a saturated state of low-temperature and low-pressure to the evaporator 104. The expansion means may be an expansion valve or an orifice structure.

The evaporator 104 evaporates the liquid-phase refrigerant of low-pressure, which flows after being discharged from the expansion means, by exchanging heat between the liquid-phase refrigerant and the indoor air of the air-conditioning case 110 so as to cool the air due to a heat absorption by an evaporative latent heat of the refrigerant. Continuously, the vapor-phase refrigerant of low-temperature and low-pressure evaporated and discharged from the evaporator 104 is inhaled to the compressor 100 again, and then, recirculates the above-mentioned cycle.

Furthermore, in the above-mentioned refrigerant circulation process, the air blown by a blower unit 130 is introduced into the air-conditioning case 110, is cooled by the evaporative latent heat of the liquid-phase refrigerant circulating inside the evaporator 104, and then, is discharged to the interior of the vehicle in a cooled state through a distribution duct 200, so that the interior of the vehicle is heated. The air blown by the blower unit 130 is introduced into the air-conditioning case 110, is heated by heat radiation of the vapor-phase refrigerant of high-temperature and high-pressure circulating inside the condenser 102 while passing through the condenser 102, and then, is discharged to the interior of the vehicle in a heated state through the distribution duct 200, so that the interior of the vehicle is cooled.

Additionally, the air conditioning system for the vehicle according to the present invention is configured by combination of the air-conditioning module 100 and the distribution duct 200.

The air-conditioning module 100 includes: an air-conditioning case 110 having a cold air passageway 111, on which the evaporator 104 is mounted, and a warm air passageway 112, on which the condenser 102 is mounted; and the blower unit 130 for blowing air to the cold air passageway 111 and the warm air passageway 112 of the air-conditioning case 110.

The distribution duct 200 includes mode doors 230 which are connected with an outlet 110b of the air-conditioning case 110 to distribute air discharged from the air-conditioning case 110 to a specific position of the interior of the vehicle according to air discharge modes. Moreover, the air-conditioning module 100 and the distribution duct 200 are divided relative to a dash panel 300 which partitions the interior of the vehicle from an engine room. That is, the air-conditioning module 100 is arranged at the engine room side relative to the dash panel 300 and the distribution duct 200 is arranged at the interior side of the vehicle relative to the dash panel 300.

As described above, the air-conditioning module 100 including the air-conditioning case 110, in which the evaporator 104 and the condenser 102 are mounted, and the blower unit 130 is arranged at the engine room side relative to the dash panel 300, the distribution duct 200 having the mode doors 230 for distributing air to the interior of the vehicle is arranged at the interior side of the vehicle relative to the dash panel 300 to be combined with each other, so that the air conditioning system for the vehicle can reduce noise and vibration in the interior of the vehicle because the air-conditioning module 100, which causes noise, is arranged at the engine room side and can secure an interior space of the vehicle to the maximum compared with the existing air conditioning systems because just the distribution duct 200 is arranged at the interior side of the vehicle.

In addition, the dash panel 300 has a through hole part 310, and as shown in the drawing, at least one through hole part 310 may be formed. Moreover, as shown in the drawing, the through hole part 310 may have a rectangular shape or one of various shapes. Furthermore, the air-conditioning module 100 arranged in the engine room and the distribution duct 200 arranged at the interior of the vehicle are combined with each other through the through hole part 310, namely, they are combined and connected with each other at the position of the through hole part 310.

In other words, the outlet 110b of the air-conditioning case 110 of the air-conditioning module 100 which penetrates through the through hole part 310 of the dash panel 300 is combined with an air inflow port 210 of the distribution duct 200, and in this instance, the air inflow port 210 of the distribution duct 200 is inserted into the outlet 110b of the air-conditioning case 110 to be combined.

Furthermore, the inside of the air-conditioning case 110 is divided into an upper part and a lower part by a division wall 113, and the cold and warm air passageways 111 and 112 are respectively arranged inside the upper part and the lower part of the air-conditioning case 110. That is, the cold air passageway 111 is arranged below the division wall 113, and the warm air passageway 112 is arranged above the division wall 113. In this instance, the cold air passageway 111 and the warm air passageway 112 are formed in such a way as to be divided from each other at the inlet 110a of the air-conditioning case 110 by the division wall 113 and meet together at the outlet 110b of the air-conditioning case 110. That is, because the division wall 113 is not formed at the outlet 110b of the air-conditioning case 110, the cold air passageway 111 and the warm air passageway 112 are joined together.

Moreover, the evaporator 104 is mounted in the cold air passageway 111, and the condenser 102 is mounted in the warm air passageway 112. Additionally, due to the up-and-down arrangement structure of the warm air passageway 112 and the cold air passageway 111, the condenser 102 and the evaporator 104 are also arranged up and down. In other words, the condenser 102 and the evaporator 104 are arranged at right angles to the axial direction that rotary shafts of motors 133 and 137 of first and second blowers 130a and 130b, which will be described later, face.

Meanwhile, cold air flows toward the cold air passageway 111 in which the evaporator 104 is mounted, and warm air flows toward the warm air passageway 112 in which the condenser 102 is mounted. Furthermore, a bypass passageway 114 is formed to penetrate the division wall 113 formed between the evaporator 104 and the condenser 102 to communicate the cold air passageway 111 and the warm air passageway 112 with each other, and a bypass door 115 is mounted on the bypass passageway 114 to open and close the bypass passageway 114.

The bypass passageway 114 bypasses some of the cold air passing through the evaporator 104 inside the cold air passageway 111 toward the warm air passageway 112, and the bypass door 115 closes the bypass passageway 114 in the cooling mode but selectively opens and closes the bypass passageway 114 in the heating mode.

Therefore, in a state where the bypass door 115 closes the bypass passageway 114, in the cooling mode, the cold air cooled by the evaporator 1004 while flowing inside the cold air passageway 111 is supplied to the interior of the vehicle to carry out cooling, and the air flowing inside the warm air passageway 112 is released out. In the heating mode, the warm air heated by the condenser 102 while flowing inside the warm air passageway 112 is supplied to the interior of the vehicle to carry out heating, and in this instance, the air flowing inside the cold air passageway 111 is released out.

Furthermore, when dehumidification is needed during the heating mode, the bypass door 115 opens the bypass passageway 114. In this instance, some of the air cooled and dehumidified by the evaporator 104 while flowing inside the cold air passageway 111 is bypassed toward the warm air passageway 112 through the bypass passageway 114, and then, is supplied to the interior of the vehicle to carry out dehumidification and heating.

Additionally, the condenser 102 is mounted at the streamside lower than the bypass passageway 114. Therefore, the cold air heated while passing through the evaporator 104 can be supplied to the condenser 102 through the bypass passageway 114.

In the meantime, the evaporator 104 is mounted at the streamside higher than the bypass passageway 114 in an air flow direction inside the cold air passageway 111.

In addition, at one side of the cold air passageway 111 of the air-conditioning case 110, disposed are a cold air discharge port 119a for discharging the cold air passing through the evaporator 104 to the outside and a cold air mode door 120 for opening and closing the cold air discharge port 119a and the cold air passageway 111. Moreover, at one side of the warm air passageway 112 of the air-conditioning case 110, disposed are a warm air discharge port 119b for discharging the warm air passing through the condenser 102 to the outside and a warm air mode door 121 for opening and closing the warm air discharge port 119b and the warm air passageway 112.

The cold air discharge port 119a and the cold air mode door 120 is disposed at the downstream side of the evaporator 104 in the cold air passageway 111, and the warm air discharge port 119b and the warm air mode door 121 is disposed at the downstream side of the condenser 102 in the warm air passageway 112. The air discharged through the cold air discharge port 119a and the warm air discharge port 119b is discharged to the outside of the vehicle through the engine room.

Therefore, in the cooling mode, the cold air mode door 120 opens the cold air passageway 111 and the warm air mode door 121 opens the warm air discharge port 119b, so that the air flowing through the cold air passageway 111 is cooled while passing through the evaporator 104. After that, the cooled air is discharged to the interior of the vehicle through the distribution duct 200 to cool the interior of the vehicle, and in this instance, the air flowing the warm air passageway 112 is heated while passing through the condenser 102, and then, is discharged to the outside through the warm air discharge port 119b.

In the heating mode, the warm air mode door 121 opens the warm air passageway 121 and the cold air mode door 120 opens the cold air discharge port 119a, so that the air flowing the warm air passageway 112 is heated while passing through the condenser 102. After that, the heated air is discharged to the interior of the vehicle through the distribution duct 200, and in this instance, the air flowing the cold air passageway 111 is cooled while passing through the evaporator 104, and then, is discharged to the outside through the cold air discharge port 119a. Additionally, the blower unit 130 for blowing air to the cold air passageway 111 and the warm air passageway 112 is mounted at the inlet 110a of the air-conditioning case 110.

Moreover, a shielding means 125 for preventing a backflow of the outdoor air to the cold air discharge port 119a and the warm air discharge port 119b is disposed on the outer face of the air-conditioning case 110.

That is, because the shielding means 125 prevents the outdoor air from flowing backward into the air-conditioning case 110 through the cold air discharge port 119a and the warm air discharge port 119b by wind pressure while the vehicle is running, such that heat is smoothly discharged out through the cold air discharge port 119a and the warm air discharge port 119b so as to improve cooling and heating performance.

The shielding means 125 is configured such that a cover plate 126 for covering the cold air discharge port 119a and the warm air discharge port 119b is formed on the outer surface of the air-conditioning case 110 where the cold air discharge port 119a and the warm air discharge port 119b are located.

The cover plate 126 is larger than the area of the cold air discharge port 119a or the warm air discharge port 119b. That is, the cover plate 126 is spaced apart from the cold air discharge port 119a and the warm air discharge port 119b at a predetermined interval, and has both end portions formed in the longitudinal direction are connected with the air-conditioning case 110 and both end portions formed in the width direction are formed to be opened.

Therefore, the cover plate 126 covers the front part of the cold air discharge port 119a and the warm air discharge port 119b to prevent the outdoor air from flowing backward toward the cold air discharge port 119a and the warm air discharge port 119b, and the air discharged through the cold air discharge port 119a and the warm air discharge port 119b inside the air-conditioning case 100 is smoothly discharged through the opened portions of the both end portions of the cover plate 126.

An air blower 130 is mounted at the inlet 110a of the air-conditioning case 110 to blow air toward the cold air passageway 111 and the warm air passageway 112.

The air blower 130 includes: a first blower 130a for blowing air toward the cold air passageway 111 through a discharge port 134 connected to the inlet 111a of the cold air passageway 111 of the air-conditioning case 110; and a second blower 130b for blowing air toward the warm air passageway 112 through a discharge port 138 connected to the inlet 112a of the warm air passageway 112 of the air-conditioning case 110.

The first blower 130a and the second blower 130b are arranged to be spaced apart from each other and opposed to each other in the width direction of the vehicle.

The first blower 130a includes: a scroll case 131 having the discharge port 134 to be connected to the inlet 111a of the cold air passageway 111 of the air-conditioning case 110; a blast fan 132 rotatably mounted inside the scroll case 131; an inlet ring 131a which is formed on one side of the scroll case 131 to introduce indoor air and outdoor air; and a motor 133 which is mounted on the other side of the scroll case 131 to rotate the blast fan 132.

The inlet ring 131a is formed on the one side of the scroll case 131 to which an intake duct 140 is located.

The second blower 130b includes: a scroll case 135 having the discharge port 138 to be connected to the inlet 112a of the warm air passageway 112 of the air-conditioning case 110; a blast fan 136 rotatably mounted inside the scroll case 135; an inlet ring 135a which is formed on one side of the scroll case 135 to introduce indoor air and outdoor air; and a motor 137 which is mounted on the other side of the scroll case 135 to rotate the blast fan 136.

The inlet ring 135a is formed on the one side of the scroll case 135 to which an intake duct 140 is located. The first blower 130a and the second blower 130b are mounted in such a way that rotary shafts of the motors 133 and 1377 are in the same direction. Furthermore, the inlet ring 131a of the first blower 130a and the inlet ring 135a of the second blower 130b are formed to be opposed to each other.

Meanwhile, the scroll cases 131 and 135 of the first and second blowers 130a and 130b are formed in a scroll type around the blast fans 132 and 136 mounted inside the blowers 130a and 130b. Therefore, cross section areas of air passageways around the blast fans 132 and 136 inside the scroll cases 131 and 135 get gradually larger from a start point to an end point of a scroll. Moreover, the discharge ports 134 and 138 of the first and second blowers 130a and 130b respectively extend from the end points of the scroll of the scroll cases 131 and 135 and are respectively connected with the cold air passageway 111 and the warm air passageway 112.

In the meantime, the scroll case 131 of the first blower 130a and the scroll case 135 of the second blower 130b are mounted to have scroll directions opposed to each other, such that the scroll case 131 of the first blower 130a is connected with the cold air passageway 111 located below the division wall 113 and the scroll case 135 of the second blower 130b is connected with the warm air passageway located above the division wall 113. Furthermore, an intake duct 140 which is connected with the first and second blowers 130a and 130b to be communicated with each other is mounted between the first blower 130a and the second blower 130b so as to supply indoor air and outdoor air to the first and second blowers 130a and 130b.

That is, one intake duct 140 is mounted between the first blower 130a and the second blower 130b, such that the first and second blowers 130a and 130b can commonly use the one intake duct 140.

As described above, because the intake duct 140 is mounted between the first blower 130a and the second blower 130b, the system using the two blowers 130a and 130b which are operated individually uses just one intake duct 140 so as to maximize space efficiency and reduce the size and manufacturing costs of the system.

The intake duct 140 includes: an outdoor air inlet 141 for introducing outdoor air; an indoor air inlet 142 for introducing indoor air; a first indoor and outdoor air converting door 147 which is mounted to open and close a passageway for communicating the indoor air inlet 142, the outdoor air inlet 141 and the first blower 130a to selectively introduce indoor air and outdoor air toward the first blower 130a; and a second indoor and outdoor air converting door 148 which is mounted to open and close a passageway for communicating the indoor air inlet 142, the outdoor air inlet 141 and the second blower 130b to selectively introduce indoor air and outdoor air toward the second blower 130b.

In other words, the first indoor and outdoor air converting door 147 is mounted at the upstream side of the inlet ring 131a of the first blower 130a between the outdoor air inlet 141 and the indoor air inlet 142 in order to selectively open and close a passageway for communicating the inlet ring 131a and the outdoor air inlet 141 with each other and a passageway for communicating the inlet ring 131a and the indoor air inlet 142 with each other.

The second indoor and outdoor air converting door 148 is mounted at the upstream side of the inlet ring 135a of the second blower 130b between the outdoor air inlet 141 and the indoor air inlet 142 in order to selectively open and close a passageway for communicating the inlet ring 135a and the outdoor air inlet 141 with each other and a passageway for communicating the inlet ring 135a and the indoor air inlet 142 with each other.

Meanwhile, it is preferable that the outdoor air inlet 141 be formed at an upper part of the intake duct 140 and the indoor air inlet 142 be formed at a lower part of the intake duct 140, but positions of the outdoor air inlet 141 and the indoor air inlet 142 may be varied.

The first indoor and outdoor air converting door 147 and the second indoor and outdoor air converting door 148 are dome-shaped doors. As described above, one intake duct 140 is mounted between the first blower 130a and second blower 130b and the first and second indoor and outdoor air converting doors 147 and 148 are mounted inside the intake duct 140, such that indoor air and outdoor air introduced into the indoor air inlet 142 and the outdoor air inlet 141 of the intake duct 140 can be selectively supplied to the first and second blowers 130a and 130b.

In the meantime, air filters (not shown) are respectively mounted on the outdoor air inlet 141 and the indoor air inlet 142 so as to remove impurities contained in the air introduced into the outdoor air inlet 141 and the indoor air inlet 142.

Furthermore, the outdoor air inlet 141 of the intake duct 140 communicates with the outside of the vehicle, and the indoor air inlet 142 of the intake duct 140 communicates with the interior of the vehicle. In this instance, an indoor air inflow duct 143 which connects the indoor air inlet 142 of the blower unit 130 with the interior of the vehicle is mounted on the outer face of the air-conditioning case 110.

That is, the indoor air inflow duct 143 is mounted on the outer face of the air-conditioning case 110 to connect the indoor air inlet 142 of the intake duct 140 with the interior of the vehicle, and in this instance, an inlet 143a of the indoor air inflow duct 143 penetrates through the dash panel 300 and is connected with the interior of the vehicle. In this instance, the outlet 110b of the air-conditioning case 110 and the inlet 143a of the indoor air inflow duct 143 are arranged side by side to penetrate the through hole part 310.

The inlet 143a of the indoor air inflow duct 143 and the outlet 110b of the air-conditioning case 110 are arranged side by side to penetrate through the through hole part 310, such that just one through hole part 310 is formed in the dash panel 300 for installation of the air conditioning system.

Moreover, the distribution duct 200 includes an air inflow port 210 connected with the outlet 110b of the air-conditioning case 110, a plurality of air outflow ports 220 for distributing air introduced into the air inflow port 210 to specific positions of the interior of the vehicle, and the mode doors 230 for controlling the degree of opening of the air outflow ports 220. The air outflow ports 220 are a defrost vent 221 and a face vent 222 which are partitioned from each other at an upper part of the distribution duct 200, and a floor vent 223 which is formed to be adjacent to the dash panel 300.

In this instance, for a passenger's comfort in the interior of the vehicle, the floor vent 223 discharges air which is warmer than that of the face vent 222, and the face vent 222 discharges air which is colder than that of the floor vent 223. Because warm air flows above the division wall 113 inside the air-conditioning case 110 and cold air flows below the division wall 113, the floor vent 223 is formed adjacent to the dash panel 300 so as to be close to the passageway in which the warm air flows.

Figure 10:
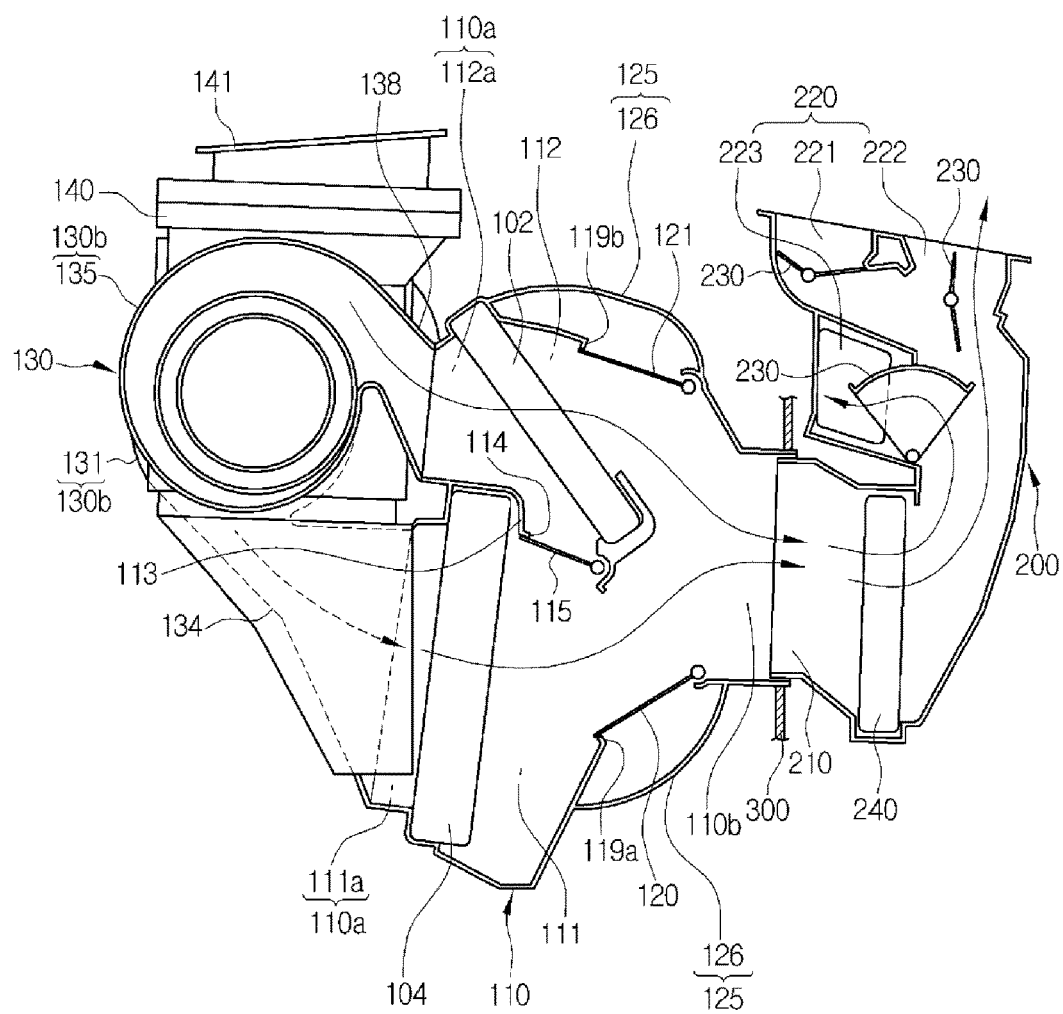
FIG. 10 is a sectional view showing a mixing mode of the air conditioning system for the vehicle according to the present invention.
Figure 11:
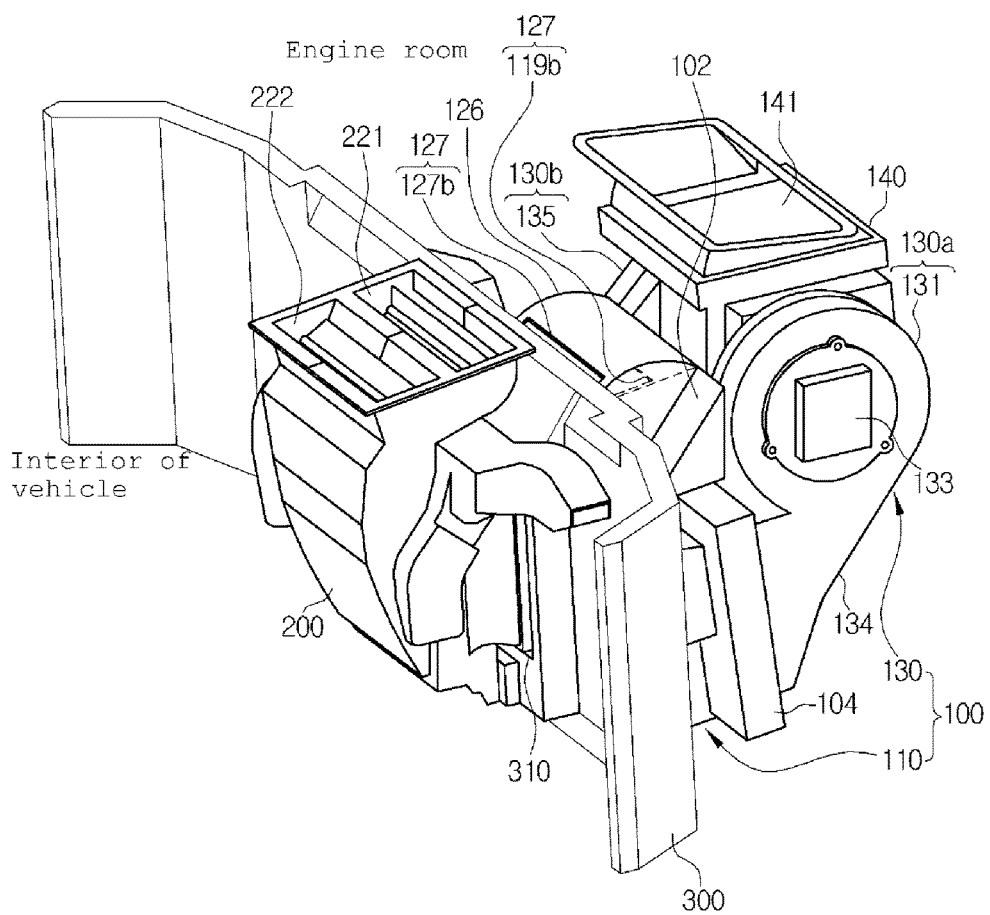
FIG. 11 is a perspective view showing an air conditioning system for a vehicle according to a modification of FIG. 3.
Figure 12:
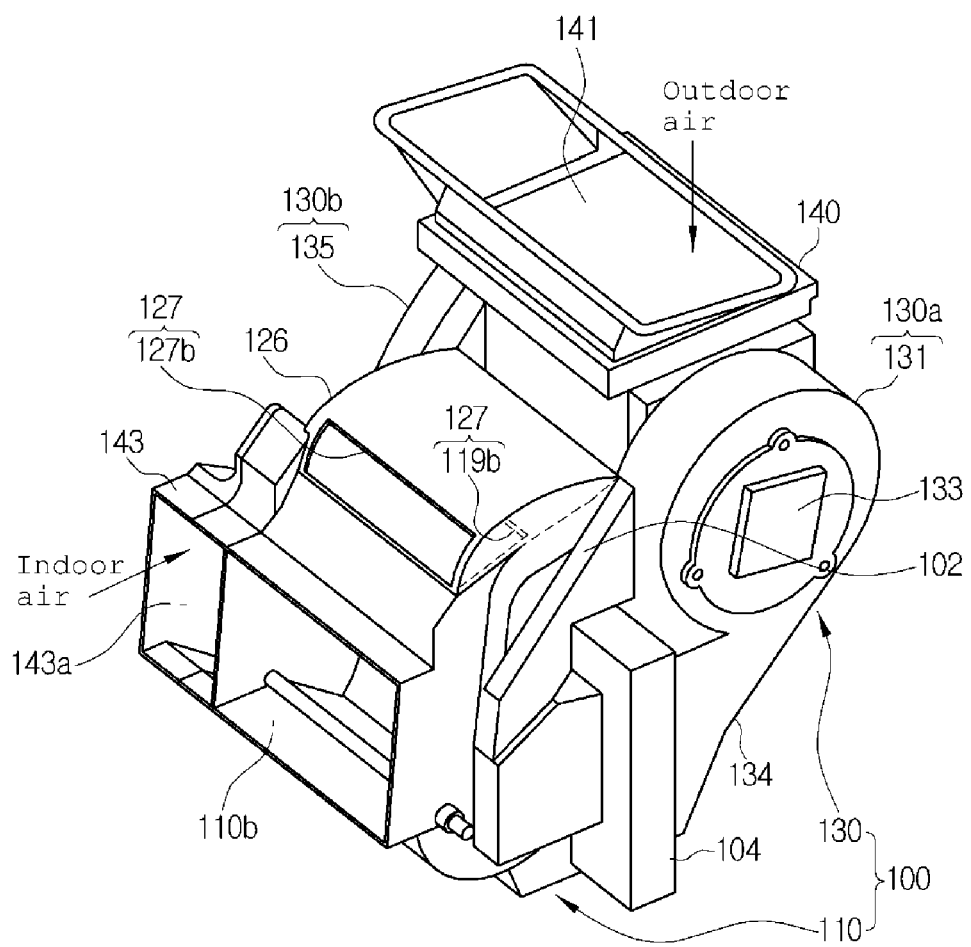
FIG. 12 is a perspective view showing an air-conditioning module of the air conditioning system for the vehicle of FIG. 11.
Figure 13:
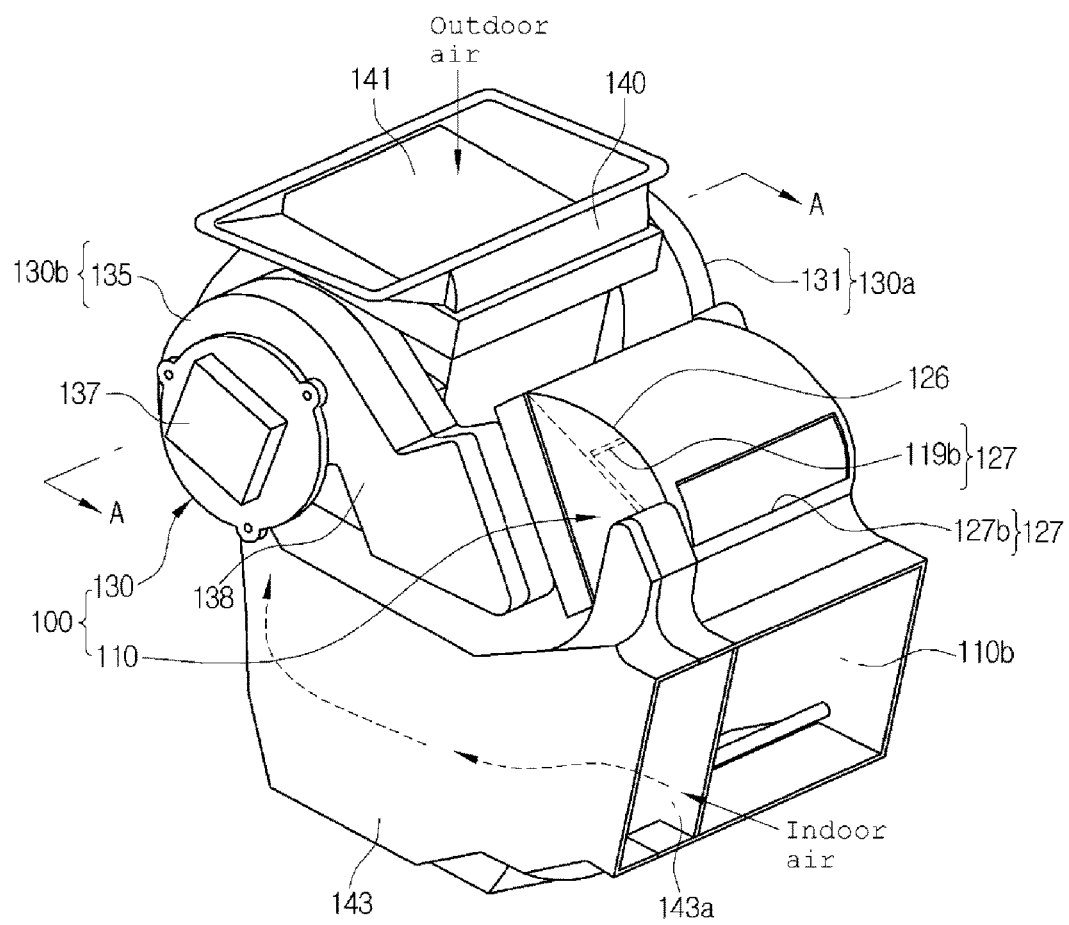
FIG. 13 is a perspective view viewed from an indoor air inflow duct of FIG. 12.
Figure 14:
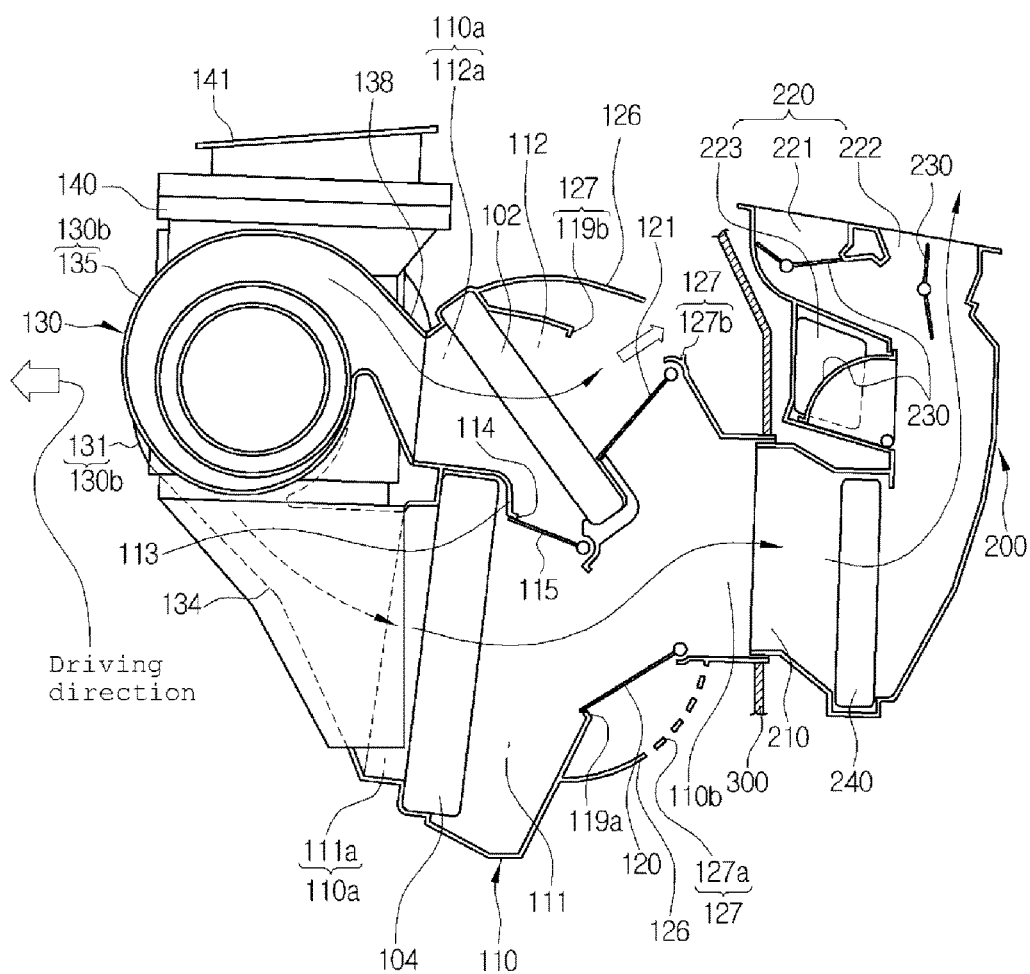
FIG. 14 is a sectional view showing a cooling mode of the air conditioning system for the vehicle of FIG. 11.
Figure 15:
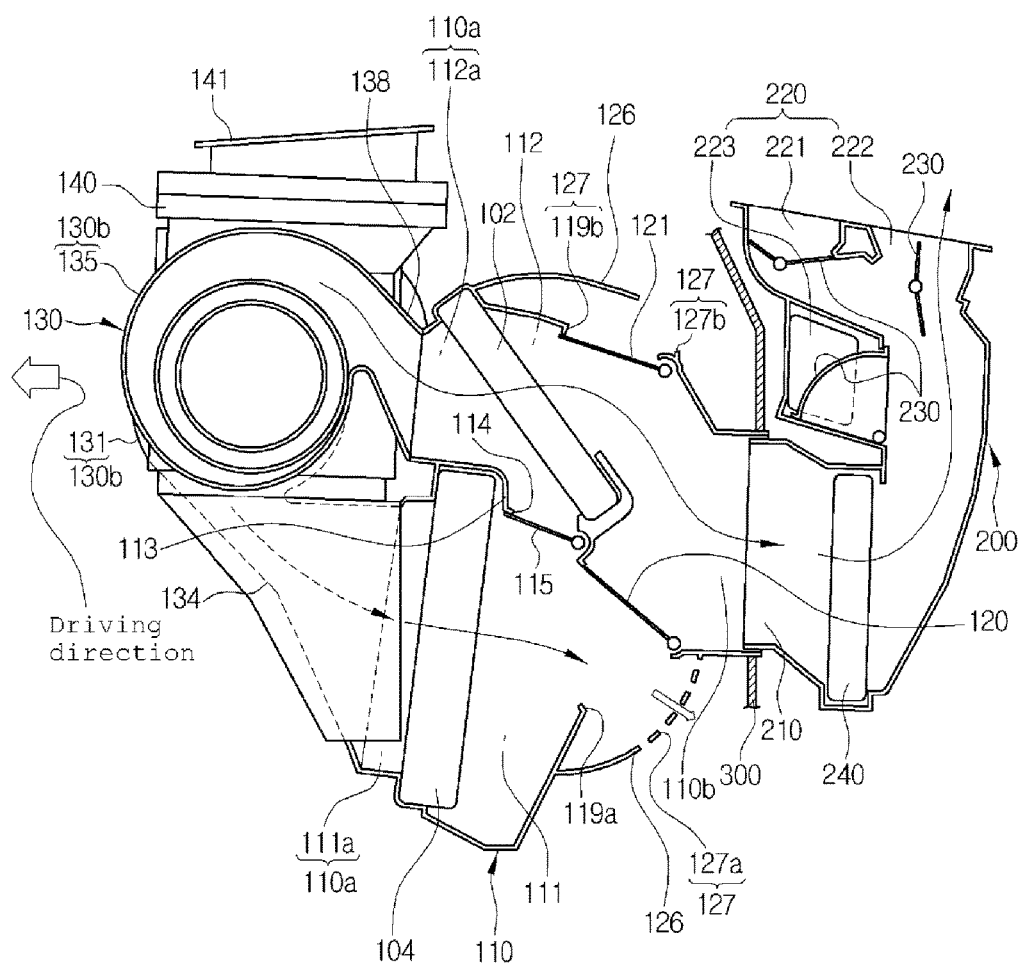
FIG. 15 is a sectional view showing a heating mode of the air conditioning system for the vehicle of FIG. 11.
Figure 16:
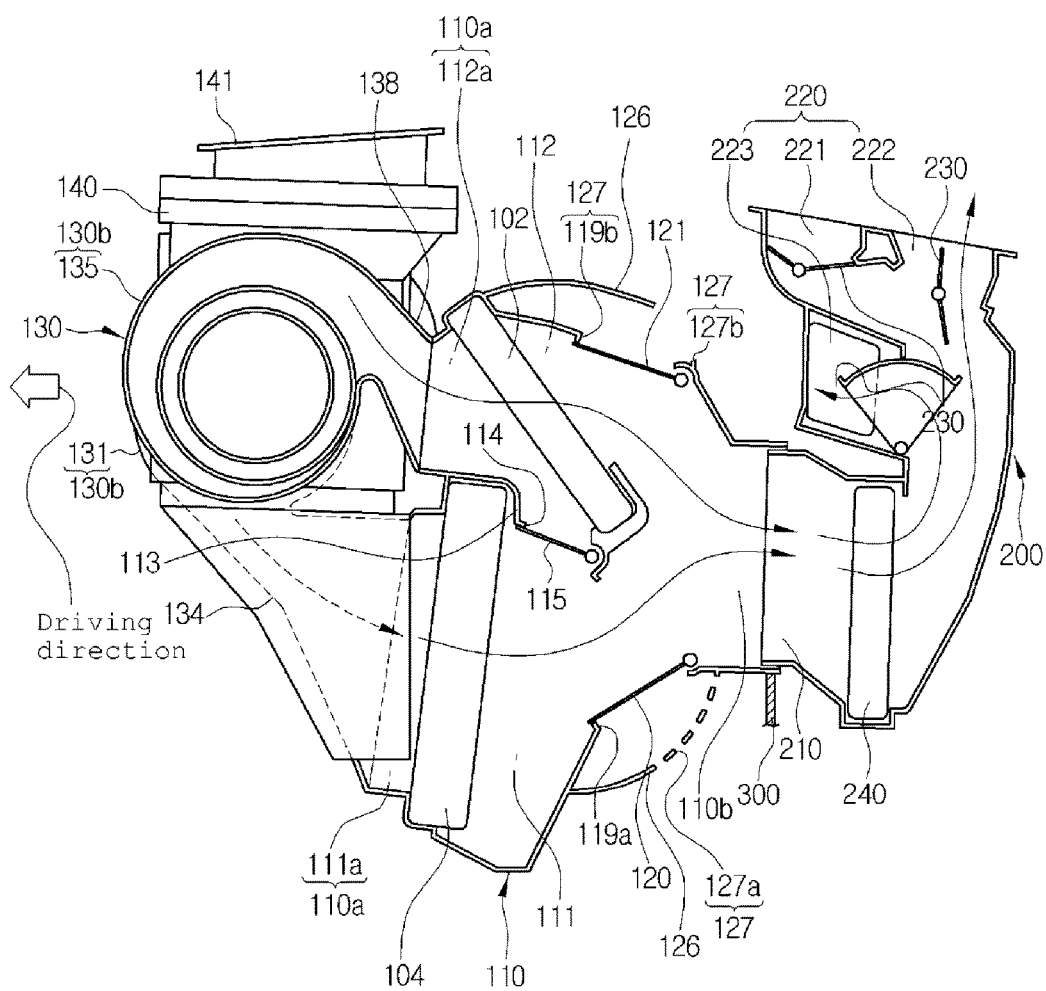
FIG. 16 is a sectional view showing a mixing mode of the air conditioning system for the vehicle of FIG. 11.

In other words, in the case of the existing air conditioning system, the floor vent is formed not to be adjacent to the dash panel 300 but to be far from the dash panel 300. However, in the distribution duct 200 according to the embodiment of the present invention, the floor vent 223 is formed adjacent to the dash panel 300. Therefore, as shown in FIG. 10, the warm air flowing along the warm air passageway 112 in the upper part of the air-conditioning case 110 and the cold air flowing along the cold air passageway 111 in the lower part of the air-conditioning case 110 are mixed together while being introduced into the distribution duct 200, but warmer air is discharged through the floor vent 223, which is close to the warm air in an aspect of the flow of air, and colder air is discharged through the face vent 222, which is close to the cold air, so as to enhance the passenger's comfort in the interior of the vehicle.

Meanwhile, the defrost vent 221 discharges air toward the front window of the interior of the vehicle, the face vent 222 discharges air toward the face of the passenger who is sitting on the front seat of the vehicle, and the floor vent 223 discharges air toward the passenger's feet.

Furthermore, the mode doors 230 are respectively mounted at the defrost vent 221, the face vent 222 and the floor vent 223 to control the degrees of opening of the vents according to the air discharge modes. In the meantime, an electric heater 240 may be mounted inside the distribution duct 200.

Hereinafter, a refrigerant flowing process of the air conditioning system for the vehicle according to the present invention will be described.

First, the vapor-phase refrigerant of high-temperature and high-pressure discharged after being compressed in the compressor is introduced into the condenser 102. The vapor-phase refrigerant introduced into the condenser 102 exchanges heat with the air passing through the condenser 102, and in the above process, the refrigerant is liquefied while being cooled. The liquid-phase refrigerant discharged from the condenser 102 is introduced into the expansion means to be decompressed and expanded.

The refrigerant decompressed and expanded in the expansion means becomes an atomized state of low-temperature and low-pressure and is introduced into the evaporator 104. The refrigerant introduced into the evaporator 104 exchanges heat with the air passing through the evaporator 104 to be evaporated. After that, the refrigerant of low-temperature and low-pressure discharged from the evaporator 104 is introduced into the compressor, and then, recirculates the above-mentioned refrigeration cycle.

Hereinafter, air flow processes in the cooling mode, in the heating mode and in the mixing mode will be described.

A. Cooling Mode

Figure 8:
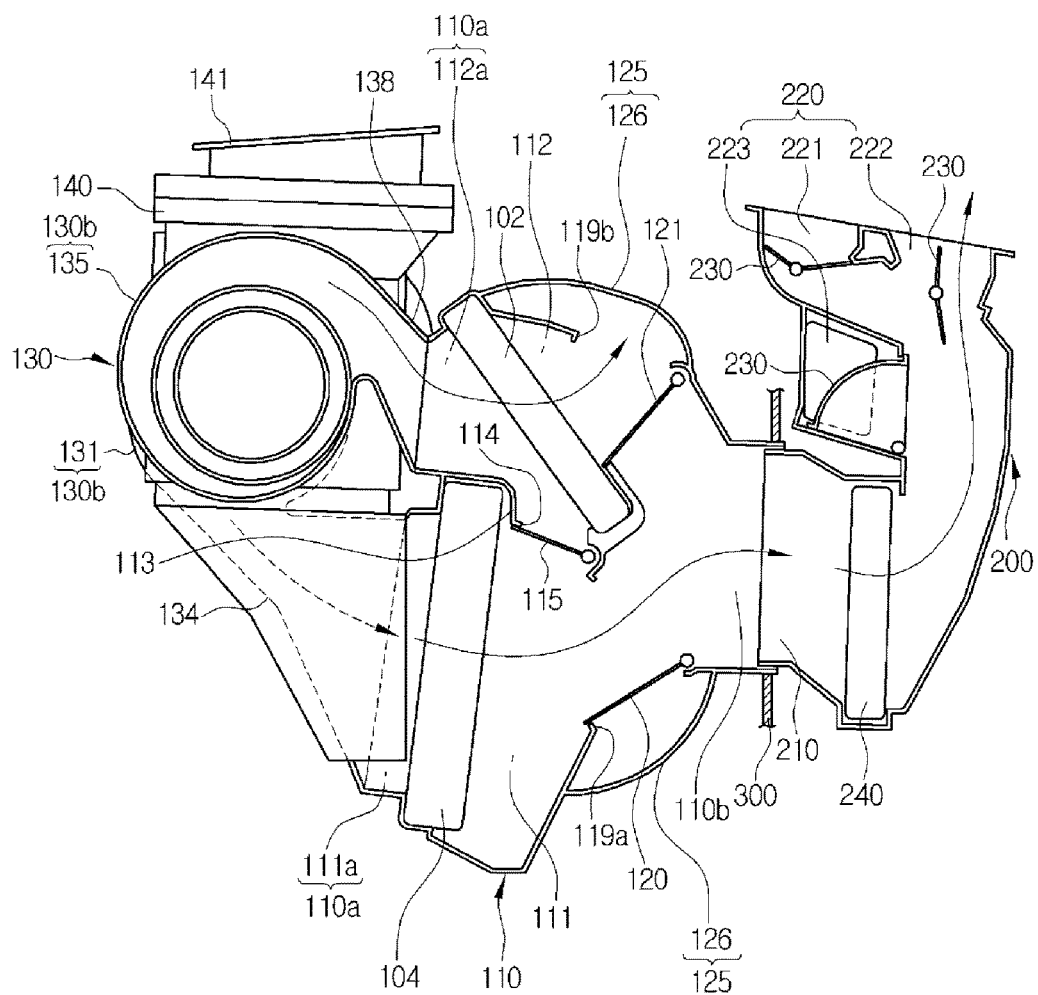
FIG. 8 is a sectional view showing a cooling mode of the air conditioning system for the vehicle according to the present invention.

In the cooling mode, as shown in FIG. 8, the cold air mode door 120 is operated to open the cold air passageway 111, and the warm air mode door 121 is operated to open the warm air discharge port 119b. Additionally, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air introduced into the intake duct 140 is inhaled to the first blower 130a and is supplied to the cold air passageway 111, and the outdoor air introduced into the intake duct 140 is inhaled to the second blower 130b and is supplied to the warm air passageway 112.

The air supplied to the cold air passageway 111 is cooled while passing through the evaporator 104, and then, flows to the distribution duct 200. After that, the air is discharged to the interior of the vehicle through the air outflow port 220 by the mode door 230 according to the air discharge mode in order to carry out cooling. In this instance, the air supplied to the warm air passageway 112 is heated while passing through the condenser 102, and then, is discharged to the exterior of the vehicle through opened portions of both end portions of the cover plate 126 after passing through the warm air discharge port 119b.

B. Heating Mode

Figure 9:
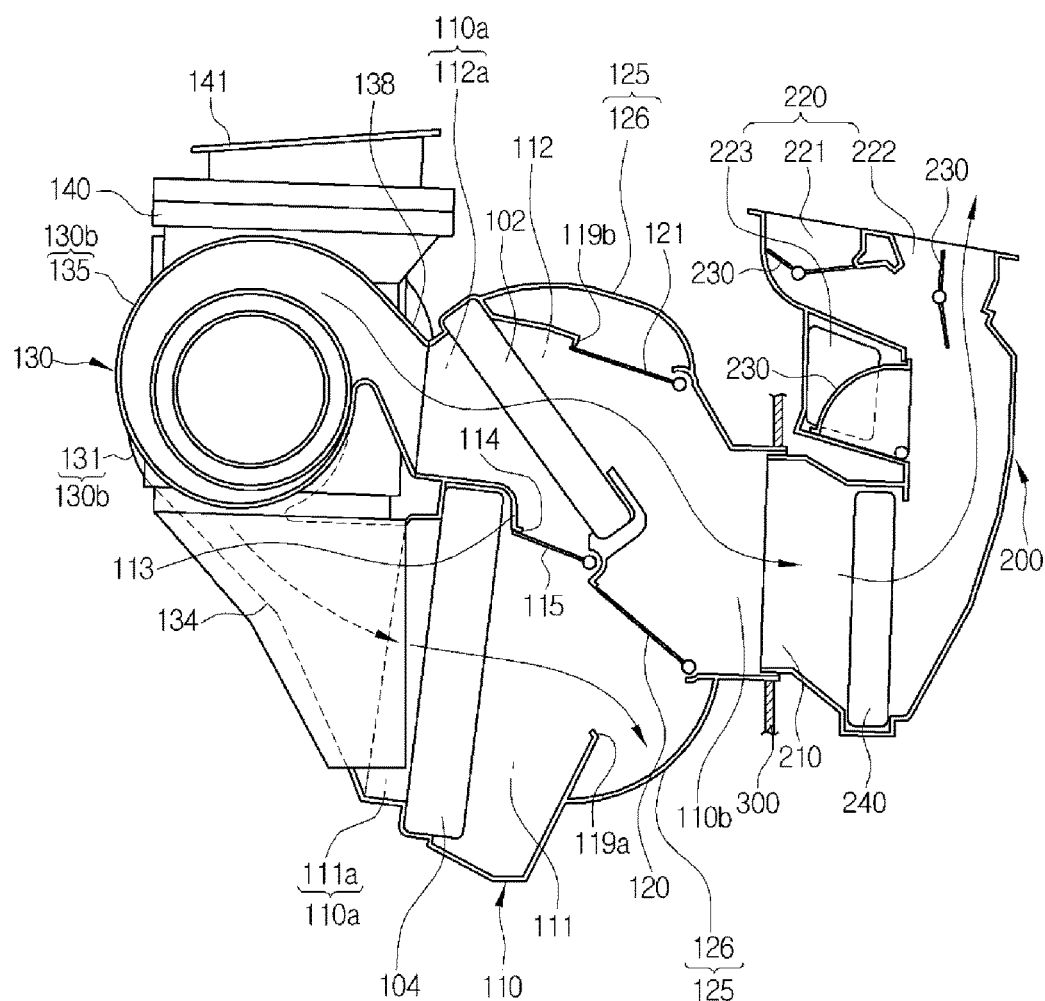
FIG. 9 is a sectional view showing a heating mode of the air conditioning system for the vehicle according to the present invention.

In the heating mode, as shown in FIG. 9, the warm air mode door 121 is operated to open the warm air passageway 112, and the cold air mode door 120 is operated to open the cold air discharge port 119a. Additionally, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air introduced into the intake duct 140 is inhaled to the first blower 130a and is supplied to the cold air passageway 111, and the outdoor air introduced into the intake duct 140 is inhaled to the second blower 130b and is supplied to the warm air passageway 112.

The air supplied to the warm air passageway 112 is heated while passing through the condenser 102, and then, flows to the distribution duct 200. After that, the air is discharged to the interior of the vehicle through the air outflow port 220 by the mode door 230 according to the air discharge mode in order to carry out heating. In this instance, the air supplied to the cold air passageway 111 is cooled while passing through the evaporator 104, and then, is discharged to the exterior of the vehicle through the cold air discharge port 119a. After that, the cooled air is discharged to the exterior of the vehicle through the opened portions of both end portions of the cover plate 126.

C. Mixing Mode

In the mixing mode, as shown in FIG. 10, the cold air mode door 120 is operated to open the cold air passageway 111, and the warm air mode door 121 is operated to open the warm air passageway 112. Additionally, the first and second indoor and outdoor air converting doors 147 and 148 are operated according to the indoor air inflow mode or the outdoor air inflow mode to selectively supply indoor air or outdoor air toward the first and second blowers 130a and 130b.

Therefore, when the first and second blowers 130a and 130b are operated, the indoor air introduced into the intake duct 140 is inhaled to the first blower 130a and is supplied to the cold air passageway 111, and the outdoor air introduced into the intake duct 140 is inhaled to the second blower 130b and is supplied to the warm air passageway 112.

The air supplied to the cold air passageway 111 is cooled while passing through the evaporator 104, and then, flows to the distribution duct 200. The air supplied to the warm air passageway 112 is heated while passing through the condenser 102, and flows to the distribution duct 200. Continuously, the cold air and the warm air flowing to the distribution duct 200 are mixed together, and then, are discharged to the interior of the vehicle through the air outflow port 220 opened by the mode door 230 according to the air discharge mode.

Referring to FIGS. 11 to 16, an air conditioning system for a vehicle according to a modification of the present invention will be described. The air conditioning system for a vehicle according to the modification of the present invention includes a compressor (not shown), a condenser 102, expansion means (not shown) and an evaporator 104, which are connected with one another in order through a refrigerant circulation line (not shown), so as to carry out cooling through the evaporator 104 and carry out heating through the condenser 102. In description of this modification, detailed description of the same components as the previous embodiment will be omitted. At one side of a cold air passageway 111 of an air-conditioning case 110, disposed are a cold air discharge port 119a for discharging the cold air (waste heat) passing through the evaporator 104 to the outside in the heating mode, and a cold air mode door 120 for opening and closing the cold air discharge port 119a and the cold air passageway 111. Moreover, at one side of the warm air passageway 112 of the air-conditioning case 110, disposed are a warm air discharge port 119b for discharging the warm air (waste heat) passing through the condenser 102 to the outside in the cooling mode, and a warm air mode door 121 for opening and closing the warm air discharge port 119b and the warm air passageway 112.

Moreover, a discharging means 127 for smoothly discharging the air discharged to the cold air discharge port 119a and the warm air discharge port 119b id provided. The discharging means 127 is configured such that the condenser 102 and the warm air discharge port 119b are arranged at the upper part and the evaporator 104 and the cold air discharge port 119a are arranged at the lower part inside the air-conditioning case 110.

The hot waste heat (warm wind), which exchanged heat with the condenser 102, is discharged upwardly in the cooling mode, and the cold waste heat (cold wind), which exchanged heat with the evaporator 104, is discharged downwardly in the heating mode. In other words, the cold air discharge port 119a and the warm air discharge port 119b is arranged such that the hot waste heat is discharged upwardly and the cold waste heat is discharged downwardly according to temperature of the waste heat. Therefore, the air conditioning system according to the present invention can enhance heating and cooling performance by smoothly discharging waste heat through the cold air discharge port 119a and the warm air discharge port 119b.

Furthermore, the discharging means 127 is configured such that the cold air discharge port 119a and the warm air discharge port 119b are formed in the direction opposite to a driving direction of the vehicle to prevent generation of a resistance of driving wind against the air discharged through the cold air discharge port 119a and the warm air discharge port 119b.

In other words, while the vehicle runs, a resistance is generated by dynamic pressure by driving wind, and it interrupts a flow of the air discharged through the cold air discharge port 119a and the warm air discharge port 119b. However, in the present invention, because the cold air discharge port 119a and the warm air discharge port 119b are formed in the direction opposite to the vehicle driving direction so as not to generate a resistance of the driving wind against the air discharged through the cold air discharge port 119a and the warm air discharge port 119b, such that the air conditioning system according to the present invention can enhance heating and cooling performance.

In the meantime, the cold air discharge port 119a and the warm air discharge port 119b are configured to be opened in the direction opposite to the vehicle driving direction. Additionally, a cover plate 126 is disposed outside the cold air discharge port 119a and the warm air discharge port 119b to prevent foreign matters from getting into the cold air discharge port 119a and the warm air discharge port 119b. In this instance, the cover plate 126 is formed to be spaced apart from the cold air discharge port 119a and the warm air discharge port 119b at a predetermined interval.

Moreover, an auxiliary cold air discharge port 127a is formed at the cover plate 126 of the cold air discharge port side to discharge cold wind passing through the cold air discharge port 119a to the outside, and an auxiliary warm air discharge port 127b is formed at the cover plate 126 of the warm air discharge port side to discharge warm wind passing through the warm air discharge port 119b to the outside. In this instance, the discharging means 127 is configured such that the auxiliary cold air discharge port 127a and the auxiliary warm air discharge port 127b are formed in the direction opposite to the vehicle driving direction to prevent generation of a resistance of the driving wind against the discharged air.

Furthermore, it is preferable that the cover plate 126 of the warm air discharge port side have an inclined surface or a curved surface such that water introduced from the outside runs down by self-load.

Additionally, a blower unit 130 is mounted at an inlet 110a of the air-conditioning case 110 to blow air toward the cold air passageway 111 and the warm air passageway 112.

The invention claimed is:

1. An air conditioning system for a vehicle comprising:
an air-conditioning case having a cold air passageway and a warm air passageway, a cold air discharge port configured to discharge cold air of the cold air passageway to outside of the vehicle, and a warm air discharge port configured to discharge warm air of the warm air passageway to outside of the vehicle;
the air-conditioning case further defining an outlet and a distribution duct connected to the outlet, wherein the distribution duct is connected to an interior of the vehicle to distribute air from the outlet of the air-conditioning duct to the interior of the vehicle according to air discharge modes; and
at least one cover plate disposed on an outer face of the air-conditioning case and overlying the cold air discharge port and the warm air discharge port to prevent outdoor air from flowing backward through the cold air discharge port and the warm air discharge port.

2. The air conditioning system according to claim 1, wherein the cover plate is formed to be larger in area than at least one of the cold air discharge port and the warm air discharge port.

3. The air conditioning system according to claim 1, wherein the cover plate is spaced apart from the cold air discharge port and the warm air discharge port at a predetermined interval, wherein the cover plate extends between a pair of longitudinal ends in a longitudinal direction, wherein the cover plate extends between a pair of width ends in a width direction being perpendicular to the longitudinal direction, and wherein both longitudinal end portions are connected with the air-conditioning case and both width end portions are spaced from the outer face of the air conditioning case.

4. The air conditioning system according to claim 1, wherein the air-conditioning case is arranged at an engine room side relative to a dash panel, which partitions an engine room from the interior of the vehicle, and the distribution duct is arranged inside the interior of the vehicle.

5. The air conditioning system according to claim 4, wherein a through hole part is formed in the dash panel, and the air-conditioning case and the distribution duct are combined with each other through the through hole part.

6. The air conditioning system according to claim 1, wherein a division wall is formed inside the air-conditioning case to divide the cold air passageway and the warm air passageway, and
   wherein the cold air passageway is arranged below the division wall, and the warm air passageway is arranged above the division wall.

7. The air conditioning system according to claim 1, further including a cold air mode door connected to the air-conditioning case and moveable between a first position and a second position, wherein in the first position the cold air mode door prevents air from flowing from the cold air passageway to the cold air discharge port and allows air to flow from the cold air passageway to the distribution duct, and wherein in the second position the cold air mode door allows air to flow from the cold air passageway through the cold air discharge port and prevents air from flowing from the cold air passageway to the distribution duct; and
   a warm air mode door connected to the air-conditioning case and moveable between a first position and a second position, wherein in the first position the warm air mode door prevents air from flowing from the warm air passageway to the warm air discharge port and allows air to flow from the warm air passageway to the distribution duct, and wherein in the second position the warm air mode door allows air to flow from the warm air passageway through the warm air discharge port and prevents air from flowing from the warm air passageway to the distribution duct.

8. The air conditioning system according to claim 1, wherein the distribution duct comprises:
   an air inflow port connected with the outlet of the air-conditioning case;
   a plurality of air outflow ports for distributing air introduced into the air inflow port to a specific position in the interior of the vehicle; and
   mode doors for controlling a degree of opening of the air outflow ports.

9. The air conditioning system according to claim 8, wherein the air outflow ports are a defrost vent and a face vent, which are partitioned from each other at an upper part of the distribution duct, and a floor vent which is formed to be adjacent to the dash panel.

10. The air conditioning system according to claim 1, wherein an evaporator is mounted at the cold air passageway, and a condenser is mounted at the warm air passageway.

11. The air conditioning system according to claim 1, wherein a blower unit is connected to the air-conditioning case to blow air to the cold air passageway and the warm air passageway.

12. The air conditioning system according to claim 1, further comprising:
   an auxiliary outlet for smoothly discharging the air discharged to the cold air discharge port and the warm air discharge port.

13. The air conditioning system according to claim 12, wherein the cold air discharge port and the warm air discharge port are formed in a direction opposite to a vehicle driving direction to prevent generation of a resistance of driving wind against the discharged air.

14. The air conditioning system according to claim 12, wherein the evaporator is mounted at the cold air passageway and the condenser is mounted at the warm air passageway, and
   wherein the the condenser and the warm air discharge port are arranged at an upper part of the air-conditioning case and the evaporator and the cold air discharge port are arranged at a lower part of the air conditioning case, such that hot waste heat, which exchanged heat with the condenser is discharged upward and cold waste heat, which exchanged heat with the evaporator is discharged downward.

15. The air conditioning system according to claim 12, wherein the auxiliary outlet includes an auxiliary cold air discharge port defined by the at least one cover plate adjacent to the cold air discharge port to discharge cold wind passing through the cold air discharge port to the outside, and wherein the auxiliary outlet further includes an auxiliary warm air discharge port defined by the at least one cover plate adjacent to the warm air discharge port to discharge warm wind passing through the warm air discharge port to the outside.

16. The air conditioning system according to claim 15, wherein the auxiliary cold air discharge port and the auxiliary warm air discharge port are formed in a direction opposite to a vehicle driving direction to prevent generation of a resistance of the driving wind against the discharged air.

17. The air conditioning system according to claim 15, wherein the condenser and the warm air discharge port are arranged at an upper part of the air conditioning case inside the air conditioning case and the evaporator and the cold air discharge port are arranged at a lower part of the air conditioning case inside the air-conditioning case, and
   wherein the at least one cover plate has an inclined surface or a curved surface such that water introduced from the outside runs down by self-load.

18. An air conditioning system for a vehicle comprising:
   an air-conditioning case defining a cold air passageway and a warm air passageway;
   the air-conditioning case further having an outer face defining a cold air discharge port into the cold air passageway and fluidly connected to an outside of the vehicle, and a warm air discharge port into the warm air passageway and fluidly connected to the outside of the vehicle;
   the air-conditioning case further including a distribution duct fluidly connected to the cold and warm air passageways and an interior of the vehicle;
   a cold air mode door connected to the air-conditioning case and moveable between a first position and a second position, wherein in the first position the cold air mode door prevents air from flowing from the cold air passageway to the cold air discharge port and allows air to flow from the cold air passageway to the distribution duct, and wherein in the second position the cold air mode door allows air to flow from the cold air passageway through the cold air discharge port and prevents air from flowing from the cold air passageway to the distribution duct; and
   a warm air mode door connected to the air-conditioning case and moveable between a first position and a second position, wherein in the first position the warm air mode door prevents air from flowing from the warm air passageway to the warm air discharge port and allows air to flow from the warm air passageway to the distribution duct, and wherein in the second position the warm air mode door allows air to flow from the warm air passageway through the warm air discharge port and prevents air from flowing from the warm air passageway to the distribution duct;
   at least one a cover plate connected to the outer face of the air-conditioning case outside of the air conditioning case and overlying the cold air discharge port and the warm air discharge port for preventing outdoor air from flowing backward through the cold air discharge port and the warm air discharge port.

* * * * *